United States Patent
Oka

(10) Patent No.: US 10,504,402 B2
(45) Date of Patent: Dec. 10, 2019

(54) IMAGE DISPLAY DEVICE AND IMAGE PROCESSING METHOD USING RED, GREEN, AND BLUE FILTERS ARRAYED IN A PREDETERMINED ARRAY PATTERN

(71) Applicant: JVC KENWOOD CORPORATION, Yokohama-shi, Kanagawa (JP)

(72) Inventor: Hisashi Oka, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 16/038,306

(22) Filed: Jul. 18, 2018

(65) Prior Publication Data

US 2018/0322822 A1    Nov. 8, 2018

Related U.S. Application Data

(63) Continuation of application No. PCT/JP2016/083884, filed on Nov. 16, 2016.

(30) Foreign Application Priority Data

Jan. 27, 2016 (JP) .................. 2016-012954

(51) Int. Cl.
*G09G 3/20* (2006.01)
*G02F 1/1335* (2006.01)
*G09G 3/36* (2006.01)

(52) U.S. Cl.
CPC ..... *G09G 3/2003* (2013.01); *G02F 1/133514* (2013.01); *G09G 3/2022* (2013.01); *G09G 3/36* (2013.01)

(58) Field of Classification Search
USPC ...................................................... 345/589
See application file for complete search history.

(56) References Cited

U.S. PATENT DOCUMENTS

2007/0008562 A1* 1/2007 Suzuki .................. G06T 3/4023
                                                              358/1.9
2015/0287763 A1* 10/2015 Huang .............. G02F 1/133514
                                                              257/89

FOREIGN PATENT DOCUMENTS

| JP | 2007-17615 A | 1/2007 |
| JP | 2008-145551 A | 6/2008 |

OTHER PUBLICATIONS

PCT/ISA/237 dated Feb. 14, 2017 issued in corresponding International Application No. PCT/JP2016/083884.

* cited by examiner

*Primary Examiner* — Shivang I Patel
(74) *Attorney, Agent, or Firm* — Nath, Goldberg & Meyer; Jerald L. Meyer; Stanley N. Protigal

(57) ABSTRACT

An image display device includes a color image separator, a filter controller, a filter processor, a display image generator, and a display. The color image separator separates red image data, green image data, and blue image data from input image data. The filter controller sets a plurality of pixel combination patterns for performing filter processing on the red image data, green image data, and blue image data. The filter processor performs filter processing for each pixel combination pattern on the red image data, green image data, and blue image data. The display image generator combines the filter-processed red image data, green image data, and blue image data, for each filter processing by the same pixel combination pattern, to generate a plurality of full color images. The display includes color filters.

6 Claims, 18 Drawing Sheets

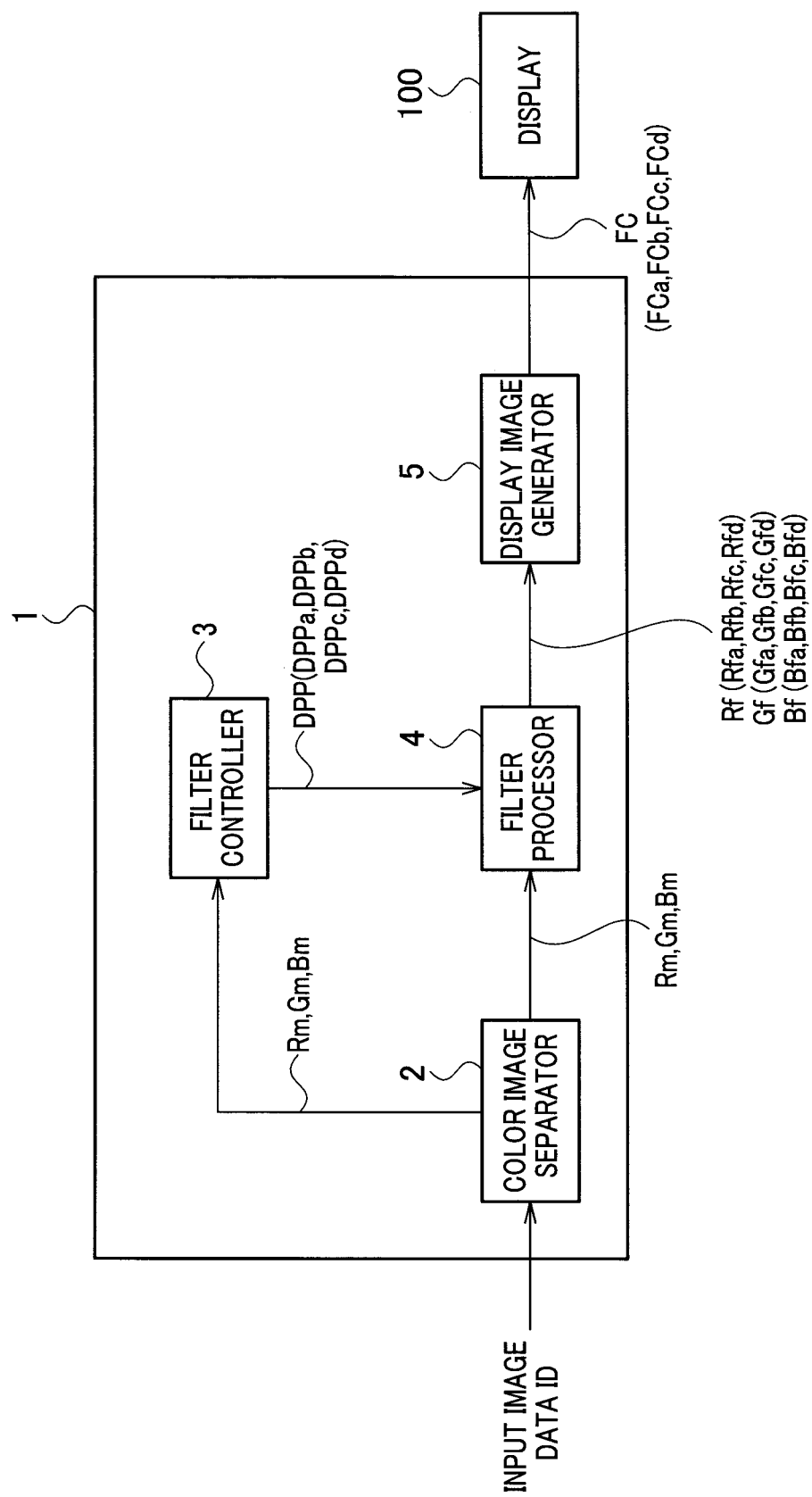

FIG. 2

|  | 1st COLUMN | 2st COLUMN | 3st COLUMN | 4st COLUMN | 5st COLUMN | 6st COLUMN | 7st COLUMN | 8st COLUMN |
|---|---|---|---|---|---|---|---|---|
| 1st ROW | R | G | B | R | G | B | R | G |
| 2st ROW | B | R | G | B | R | G | B | R |
| 3st ROW | G | B | R | G | B | R | G | B |
| 4st ROW | R | G | B | R | G | B | R | G |
| 5st ROW | B | R | G | B | R | G | B | R |
| 6st ROW | G | B | R | G | B | R | G | B |
| 7st ROW | R | G | B | R | G | B | R | G |
| 8st ROW | B | R | G | B | R | G | B | R |
| 9st ROW | G | B | R | G | B | R | G | B |

FIG. 3

| RGB11 | RGB12 | RGB13 | RGB14 | RGB15 | RGB16 | RGB17 | RGB18 |
|---|---|---|---|---|---|---|---|
| RGB21 | RGB22 | RGB23 | RGB24 | RGB25 | RGB26 | RGB27 | RGB28 |
| RGB31 | RGB32 | RGB33 | RGB34 | RGB35 | RGB36 | RGB37 | RGB38 |
| RGB41 | RGB42 | RGB43 | RGB44 | RGB45 | RGB46 | RGB47 | RGB48 |
| RGB51 | RGB52 | RGB53 | RGB54 | RGB55 | RGB56 | RGB57 | RGB58 |
| RGB61 | RGB62 | RGB63 | RGB64 | RGB65 | RGB66 | RGB67 | RGB68 |
| RGB71 | RGB72 | RGB73 | RGB74 | RGB75 | RGB76 | RGB77 | RGB78 |
| RGB81 | RGB82 | RGB83 | RGB84 | RGB85 | RGB86 | RGB87 | RGB88 |
| RGB91 | RGB92 | RGB93 | RGB94 | RGB95 | RGB96 | RGB97 | RGB98 |

FIG. 5

| R11 | R12 | R13 | R14 | R15 | R16 | R17 | R18 |
|---|---|---|---|---|---|---|---|
| R21 | R22 | R23 | R24 | R25 | R26 | R27 | R28 |
| R31 | R32 | R33 | R34 | R35 | R36 | R37 | R38 |
| R41 | R42 | R43 | R44 | R45 | R46 | R47 | R48 |
| R51 | R52 | R53 | R54 | R55 | R56 | R57 | R58 |
| R61 | R62 | R63 | R64 | R65 | R66 | R67 | R68 |
| R71 | R72 | R73 | R74 | R75 | R76 | R77 | R78 |
| R81 | R82 | R83 | R84 | R85 | R86 | R87 | R88 |
| R91 | R92 | R93 | R94 | R95 | R96 | R97 | R98 |

| G11 | G12 | G13 | G14 | G15 | G16 | G17 | G18 |
|---|---|---|---|---|---|---|---|
| G21 | G22 | G23 | G24 | G25 | G26 | G27 | G28 |
| G31 | G32 | G33 | G34 | G35 | G36 | G37 | G38 |
| G41 | G42 | G43 | G44 | G45 | G46 | G47 | G48 |
| G51 | G52 | G53 | G54 | G55 | G56 | G57 | G58 |
| G61 | G62 | G63 | G64 | G65 | G66 | G67 | G68 |
| G71 | G72 | G73 | G74 | G75 | G76 | G77 | G78 |
| G81 | G82 | G83 | G84 | G85 | G86 | G87 | G88 |
| G91 | G92 | G93 | G94 | G95 | G96 | G97 | G98 |

Gm

FIG. 7
| B11 | B12 | B13 | B14 | B15 | B16 | B17 | B18 |
| --- | --- | --- | --- | --- | --- | --- | --- |
| B21 | B22 | B23 | B24 | B25 | B26 | B27 | B28 |
| B31 | B32 | B33 | B34 | B35 | B36 | B37 | B38 |
| B41 | B42 | B43 | B44 | B45 | B46 | B47 | B48 |
| B51 | B52 | B53 | B54 | B55 | B56 | B57 | B58 |
| B61 | B62 | B63 | B64 | B65 | B66 | B67 | B68 |
| B71 | B72 | B73 | B74 | B75 | B76 | B77 | B78 |
| B81 | B82 | B83 | B84 | B85 | B86 | B87 | B88 |
| B91 | B92 | B93 | B94 | B95 | B96 | B97 | B98 |
FIG. 8A
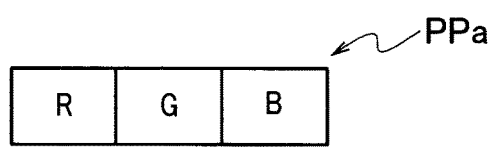
FIG. 8B
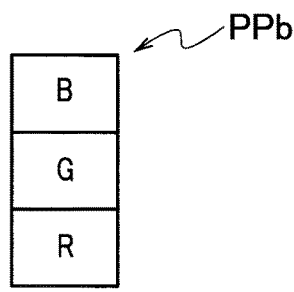
FIG. 8C
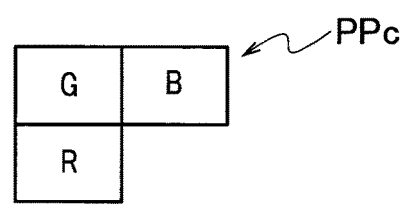
FIG. 8D
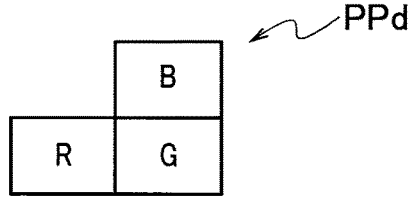

FIG. 9

| R11 | R12 | R13 | R14 | R15 | R16 | R17 | R18 |
|-----|-----|-----|-----|-----|-----|-----|-----|
| R21 | R22 | R23 | R24 | R25 | R26 | R27 | R28 |
| R31 | R32 | R33 | R34 | R35 | R36 | R37 | R38 |
| R41 | R42 | R43 | R44 | R45 | R46 | R47 | R48 |
| R51 | R52 | R53 | R54 | R55 | R56 | R57 | R58 |
| R61 | R62 | R63 | R64 | R65 | R66 | R67 | R68 |
| R71 | R72 | R73 | R74 | R75 | R76 | R77 | R78 |
| R81 | R82 | R83 | R84 | R85 | R86 | R87 | R88 |
| R91 | R92 | R93 | R94 | R95 | R96 | R97 | R98 |

PPa (top, top, right), PPa (left, left), Rm

FIG. 10

| R11a |      |      | R14a |      |      | R17a |      |
|------|------|------|------|------|------|------|------|
|      | R22a |      |      | R25a |      |      | R28a |
|      |      | R33a |      |      | R36a |      |      |
| R41a |      |      | R44a |      |      | R47a |      |
|      | R52a |      |      | R55a |      |      | R58a |
|      |      | R63a |      |      | R66a |      |      |
| R71a |      |      | R74a |      |      | R77a |      |
|      | R82a |      |      | R85a |      |      | R88a |
|      |      | R93a |      |      | R96a |      |      |

Rfa

FIG. 11

| G11 | G12 | G13 | G14 | G15 | G16 | G17 | G18 |
|-----|-----|-----|-----|-----|-----|-----|-----|
| G21 | G22 | G23 | G24 | G25 | G26 | G27 | G28 |
| G31 | G32 | G33 | G34 | G35 | G36 | G37 | G38 |
| G41 | G42 | G43 | G44 | G45 | G46 | G47 | G48 |
| G51 | G52 | G53 | G54 | G55 | G56 | G57 | G58 |
| G61 | G62 | G63 | G64 | G65 | G66 | G67 | G68 |
| G71 | G72 | G73 | G74 | G75 | G76 | G77 | G78 |
| G81 | G82 | G83 | G84 | G85 | G86 | G87 | G88 |
| G91 | G92 | G93 | G94 | G95 | G96 | G97 | G98 |

Gm; PPa

FIG. 12

| | G12a | | | G15a | | | G18a |
|---|---|---|---|---|---|---|---|
| | | G23a | | | G26a | | |
| G31a | | | G34a | | | G37a | |
| | G42a | | | G45a | | | G48a |
| | | G53a | | | G56a | | |
| G61a | | | G64a | | | G67a | |
| | G72a | | | G75a | | | G78a |
| | | G83a | | | G86a | | |
| G91a | | | G94a | | | G97a | |

Gfa

FIG. 13

| | | PPa | | PPa | | | | Bm |
|---|---|---|---|---|---|---|---|---|
| B11 | B12 | B13 | B14 | B15 | B16 | B17 | B18 | |
| B21 | B22 | B23 | B24 | B25 | B26 | B27 | B28 | |
| B31 | B32 | B33 | B34 | B35 | B36 | B37 | B38 | PPa |
| B41 | B42 | B43 | B44 | B45 | B46 | B47 | B48 | |
| B51 | B52 | B53 | B54 | B55 | B56 | B57 | B58 | |
| B61 | B62 | B63 | B64 | B65 | B66 | B67 | B68 | PPa |
| B71 | B72 | B73 | B74 | B75 | B76 | B77 | B78 | |
| B81 | B82 | B83 | B84 | B85 | B86 | B87 | B88 | |
| B91 | B92 | B93 | B94 | B95 | B96 | B97 | B98 | |

PPa labels point to column above B41 and row of B71.

FIG. 14

| | | B13a | | | B16a | | | Bfa |
|---|---|---|---|---|---|---|---|---|
| B21a | | | B24a | | | B27a | | |
| | B32a | | | B35a | | | B38a | |
| | | B43a | | | B46a | | | |
| B51a | | | B54a | | | B57a | | |
| | B62a | | | B65a | | | B68a | |
| | | B73a | | | B76a | | | |
| B81a | | | B84a | | | B87a | | |
| | B92a | | | B95a | | | B98a | |

FIG. 15

|  |  | PPb |  |  | PPb |  |  |
|---|---|---|---|---|---|---|---|
| R11 | R12 | R13 | R14 | R15 | R16 | R17 | R18 |
| R21 | R22 | R23 | R24 | R25 | R26 | R27 | R28 |
| R31 | R32 | R33 | R34 | R35 | R36 | R37 | R38 |
| R41 | R42 | R43 | R44 | R45 | R46 | R47 | R48 |
| R51 | R52 | R53 | R54 | R55 | R56 | R57 | R58 |
| R61 | R62 | R63 | R64 | R65 | R66 | R67 | R68 |
| R71 | R72 | R73 | R74 | R75 | R76 | R77 | R78 |
| R81 | R82 | R83 | R84 | R85 | R86 | R87 | R88 |
| R91 | R92 | R93 | R94 | R95 | R96 | R97 | R98 |

PPb (left side, rows 3 and 6); PPb (right side, rows 4 and 7); Rm

FIG. 16

| R11b |  |  | R14b |  |  | R17b |  |
|---|---|---|---|---|---|---|---|
|  | R22b |  |  | R25b |  |  | R28b |
|  |  | R33b |  |  | R36b |  |  |
| R41b |  |  | R44b |  |  | R47b |  |
|  | R52b |  |  | R55b |  |  | R58b |
|  |  | R63b |  |  | R66b |  |  |
| R71b |  |  | R74b |  |  | R77b |  |
|  | R82b |  |  | R85b |  |  | R88b |
|  |  | R93b |  |  | R96b |  |  |

Rfb

FIG. 19

| | PPc | | | PPc | | | | Rm |
|---|---|---|---|---|---|---|---|---|
| R11 | R12 | R13 | R14 | R15 | R16 | R17 | R18 | |
| R21 | R22 | R23 | R24 | R25 | R26 | R27 | R28 | |
| R31 | R32 | R33 | R34 | R35 | R36 | R37 | R38 | PPc |
| R41 | R42 | R43 | R44 | R45 | R46 | R47 | R48 | |
| R51 | R52 | R53 | R54 | R55 | R56 | R57 | R58 | |
| R61 | R62 | R63 | R64 | R65 | R66 | R67 | R68 | PPc |
| R71 | R72 | R73 | R74 | R75 | R76 | R77 | R78 | |
| R81 | R82 | R83 | R84 | R85 | R86 | R87 | R88 | |
| R91 | R92 | R93 | R94 | R95 | R96 | R97 | R98 | |

PPc (left labels at rows R31, R61)

FIG. 20

Rfc

| R11c | | | R14c | | | R17c | |
|---|---|---|---|---|---|---|---|
| | R22c | | | R25c | | | R28c |
| | | R33c | | | R36c | | |
| R41c | | | R44c | | | R47c | |
| | R52c | | | R55c | | | R58c |
| | | R63c | | | R66c | | |
| R71c | | | R74c | | | R77c | |
| | R82c | | | R85c | | | R88c |
| | | R93c | | | R96c | | |

FIG. 21

|  | G12c |  |  | G15c |  |  | G18c |
|---|---|---|---|---|---|---|---|
|  |  | G23c |  |  | G26c |  |  |
| G31c |  |  | G34c |  |  | G37c |  |
|  | G42c |  |  | G45c |  |  | G48c |
|  |  | G53c |  |  | G56c |  |  |
| G61c |  |  | G64c |  |  | G67c |  |
|  | G72c |  |  | G75c |  |  | G78c |
|  |  | G83c |  |  | G86c |  |  |
| G91c |  |  | G94c |  |  | G97c |  |

Gfc

FIG. 22

|  |  | B13c |  |  | B16c |  |  |
|---|---|---|---|---|---|---|---|
| B21c |  |  | B24c |  |  | B27c |  |
|  | B32c |  |  | B35c |  |  | B38c |
|  |  | B43c |  |  | B46c |  |  |
| B51c |  |  | B54c |  |  | B57c |  |
|  | B62c |  |  | B65c |  |  | B68c |
|  |  | B73c |  |  | B76c |  |  |
| B81c |  |  | B84c |  |  | B87c |  |
|  | B92c |  |  | B95c |  |  | B98c |

Bfc

FIG. 23

|      |      | PPd  |      |      | PPd  |      |      |
|------|------|------|------|------|------|------|------|
| R11  | R12  | R13  | R14  | R15  | R16  | R17  | R18  |
| R21  | R22  | R23  | R24  | R25  | R26  | R27  | R28  |
| R31  | R32  | R33  | R34  | R35  | R36  | R37  | R38  |
| R41  | R42  | R43  | R44  | R45  | R46  | R47  | R48  |
| R51  | R52  | R53  | R54  | R55  | R56  | R57  | R58  |
| R61  | R62  | R63  | R64  | R65  | R66  | R67  | R68  |
| R71  | R72  | R73  | R74  | R75  | R76  | R77  | R78  |
| R81  | R82  | R83  | R84  | R85  | R86  | R87  | R88  |
| R91  | R92  | R93  | R94  | R95  | R96  | R97  | R98  |

Rm, PPd

FIG. 24

| R11d |      |      | R14d |      |      | R17d |      |
|------|------|------|------|------|------|------|------|
|      | R22d |      |      | R25d |      |      | R28d |
|      |      | R33d |      |      | R36d |      |      |
| R41d |      |      | R44d |      |      | R47d |      |
|      | R52d |      |      | R55d |      |      | R58d |
|      |      | R63d |      |      | R66d |      |      |
| R71d |      |      | R74d |      |      | R77d |      |
|      | R82d |      |      | R85d |      |      | R88d |
|      |      | R93d |      |      | R96d |      |      |

Rfd

| R11a | G12a | B13a | R14a | G15a | B16a | R17a | G18a |
|------|------|------|------|------|------|------|------|
| B21a | R22a | G23a | B24a | R25a | G26a | B27a | R28a |
| G31a | B32a | R33a | G34a | B35a | R36a | G37a | B38a |
| R41a | G42a | B43a | R44a | G45a | B46a | R47a | G48a |
| B51a | R52a | G53a | B54a | R55a | G56a | B57a | R58a |
| G61a | B62a | R63a | G64a | B65a | R66a | G67a | B68a |
| R71a | G72a | B73a | R74a | G75a | B76a | R77a | G78a |
| B81a | R82a | G83a | B84a | R85a | G86a | B87a | R88a |
| G91a | B92a | R93a | G94a | B95a | R96a | G97a | B98a |

FCa

FIG. 28

| R11b | G12b | B13b | R14b | G15b | B16b | R17b | G18b |
|------|------|------|------|------|------|------|------|
| B21b | R22b | G23b | B24b | R25b | G26b | B27b | R28b |
| G31b | B32b | R33b | G34b | B35b | R36b | G37b | B38b |
| R41b | G42b | B43b | R44b | G45b | B46b | R47b | G48b |
| B51b | R52b | G53b | B54b | R55b | G56b | B57b | R58b |
| G61b | B62b | R63b | G64b | B65b | R66b | G67b | B68b |
| R71b | G72b | B73b | R74b | G75b | B76b | R77b | G78b |
| B81b | R82b | G83b | B84b | R85b | G86b | B87b | R88b |
| G91b | B92b | R93b | G94b | B95b | R96b | G97b | B98b |

FCb

| R11c | G12c | B13c | R14c | G15c | B16c | R17c | G18c |
|------|------|------|------|------|------|------|------|
| B21c | R22c | G23c | B24c | R25c | G26c | B27c | R28c |
| G31c | B32c | R33c | G34c | B35c | R36c | G37c | B38c |
| R41c | G42c | B43c | R44c | G45c | B46c | R47c | G48c |
| B51c | R52c | G53c | B54c | R55c | G56c | B57c | R58c |
| G61c | B62c | R63c | G64c | B65c | R66c | G67c | B68c |
| R71c | G72c | B73c | R74c | G75c | B76c | R77c | G78c |
| B81c | R82c | G83c | B84c | R85c | G86c | B87c | R88c |
| G91c | B92c | R93c | G94c | B95c | R96c | G97c | B98c |

| R11d | G12d | B13d | R14d | G15d | B16d | R17d | G18d |
|------|------|------|------|------|------|------|------|
| B21d | R22d | G23d | B24d | R25d | G26d | B27d | R28d |
| G31d | B32d | R33d | G34d | B35d | R36d | G37d | B38d |
| R41d | G42d | B43d | R44d | G45d | B46d | R47d | G48d |
| B51d | R52d | G53d | B54d | R55d | G56d | B57d | R58d |
| G61d | B62d | R63d | G64d | B65d | R66d | G67d | B68d |
| R71d | G72d | B73d | R74d | G75d | B76d | R77d | G78d |
| B81d | R82d | G83d | B84d | R85d | G86d | B87d | R88d |
| G91d | B92d | R93d | G94d | B95d | R96d | G97d | B98d |

IMAGE DISPLAY DEVICE AND IMAGE PROCESSING METHOD USING RED, GREEN, AND BLUE FILTERS ARRAYED IN A PREDETERMINED ARRAY PATTERN

CROSS REFERENCE TO RELATED APPLICATION

This application is a Continuation of PCT Application No. PCT/JP2016/083884, filed on Nov. 16, 2016, and claims the priority of Japanese Patent Application No. 2006-012954, filed on Jan. 27, 2016, the entire contents of both of which are incorporated herein by reference.

BACKGROUND

The present disclosure relates to an image display device and an image processing method which displays an image by a color filter method.

Japanese Unexamined Patent Application Publication No. 2008-145551 discloses an image display device which displays an image by a color filter method. The image display device employing the color filter method includes a liquid crystal panel or a projector of a single-plate light valve system, or the like. A liquid crystal display element used for the liquid crystal panel or the projector includes red pixels each having a red filter, green pixels each having a green filter, and blue pixels each having a blue filter, which are set in a predetermined arrangement.

SUMMARY

In the image display device employing the color filter method, three pixels of a red pixel, a green pixel, and a blue pixel constitute one pixel for displaying a full color image. Hence, according to the image display device employing the color filter method, the resolution of the display image with respect to an input image sometimes decreases.

A first aspect of one or more embodiments provides an image display device including: a color image separator configured to separate red image data, green image data, and blue image data from input image data; a filter controller configured to set a plurality of pixel combination patterns for performing filter processing on the red image data, green image data, and blue image data; a filter processor configured to perform filter processing for each pixel combination pattern on the red image data, the green image data, and the blue image data; a display image generator configured to combine the filter-processed red image data, green image data, and blue image data, for each filter processing by the same pixel combination pattern, to generate a plurality of full color images; and a display comprising color filters, wherein each of the pixel combination patterns comprises three or more adjacent pixels, and each of the three or more adjacent pixels comprises one or more pixels corresponding to red, green, and blue in an arrangement pattern of the color filters.

A second aspect of one or more embodiments provides an image processing method including: separating red image data, green image data, and blue image data from input image data; setting a plurality of pixel combination patterns for performing filter processing on the red image data, green image data, and blue image data; performing filter processing for each pixel combination pattern on the red image data, green image data, and blue image data; and combining the filter-processed red image data, green image data, and blue image data, for each filter processing by the same pixel combination pattern, thus generating a plurality of full color images.

BRIEF DESCRIPTION OF THE DRAWINGS

FIG. 1 is a block diagram illustrating an image processing device according to first and second embodiments.

FIG. 2 is a schematic diagram illustrating a display having a configuration in which pixels are diagonally arrayed.

FIG. 3 is a schematic diagram illustrating an input image to be inputted to the color image separator of the image processing device.

FIG. 5 is a schematic diagram illustrating a red image.

FIG. 6 is a schematic diagram illustrating a green image.

FIG. 7 is a schematic diagram illustrating a blue image.

FIGS. 8A-8D are schematic diagrams illustrating an example of a plurality of pixel combination patterns in a case where the pixel of interest is a G pixel in the diagonal array.

FIG. 9 is a schematic diagram illustrating a relationship between a red image and a pixel combination pattern.

FIG. 10 is a schematic diagram illustrating a red image generated by filter processing based on the pixel combination pattern.

FIG. 11 is a schematic diagram illustrating a relationship between a green image and a pixel combination pattern.

FIG. 12 is a schematic diagram illustrating a green image generated by filter processing based on the pixel combination pattern.

FIG. 13 is a schematic diagram illustrating a relationship between a blue image and a pixel combination pattern.

FIG. 14 is a schematic diagram illustrating a blue image generated by filter processing based on the pixel combination pattern.

FIG. 15 is a schematic diagram illustrating a relationship between a red image and a pixel combination pattern.

FIG. 16 is a schematic diagram illustrating a red image generated by filter processing based on the pixel combination pattern.

FIG. 19 is a schematic diagram illustrating a relationship between a red image and a pixel combination pattern.

FIG. 20 is a schematic diagram illustrating a red image generated by filter processing based on the pixel combination pattern.

FIG. 21 is a schematic diagram illustrating a green image generated by filter processing based on the pixel combination pattern.

FIG. 22 is a schematic diagram illustrating a blue image generated by filter processing based on the pixel combination pattern.

FIG. 23 is a schematic diagram illustrating a relationship between a red image and a pixel combination pattern.

FIG. 24 is a schematic diagram illustrating a red image generated by filter processing based on the pixel combination pattern.

FIG. 25 is a schematic diagram illustrating a green image generated by filter processing based on the pixel combination pattern.

FIG. 26 is a schematic diagram illustrating a blue image generated by filter processing based on the pixel combination pattern.

FIG. 27 is a schematic diagram illustrating a full color image obtained by combining a red image, a green image, and a blue image generated by the filter processing.

FIG. 28 is a schematic diagram illustrating a full color image obtained by combining a red image, a green image, and a blue image generated by the filter processing.

DETAILED DESCRIPTION

Figure 4:
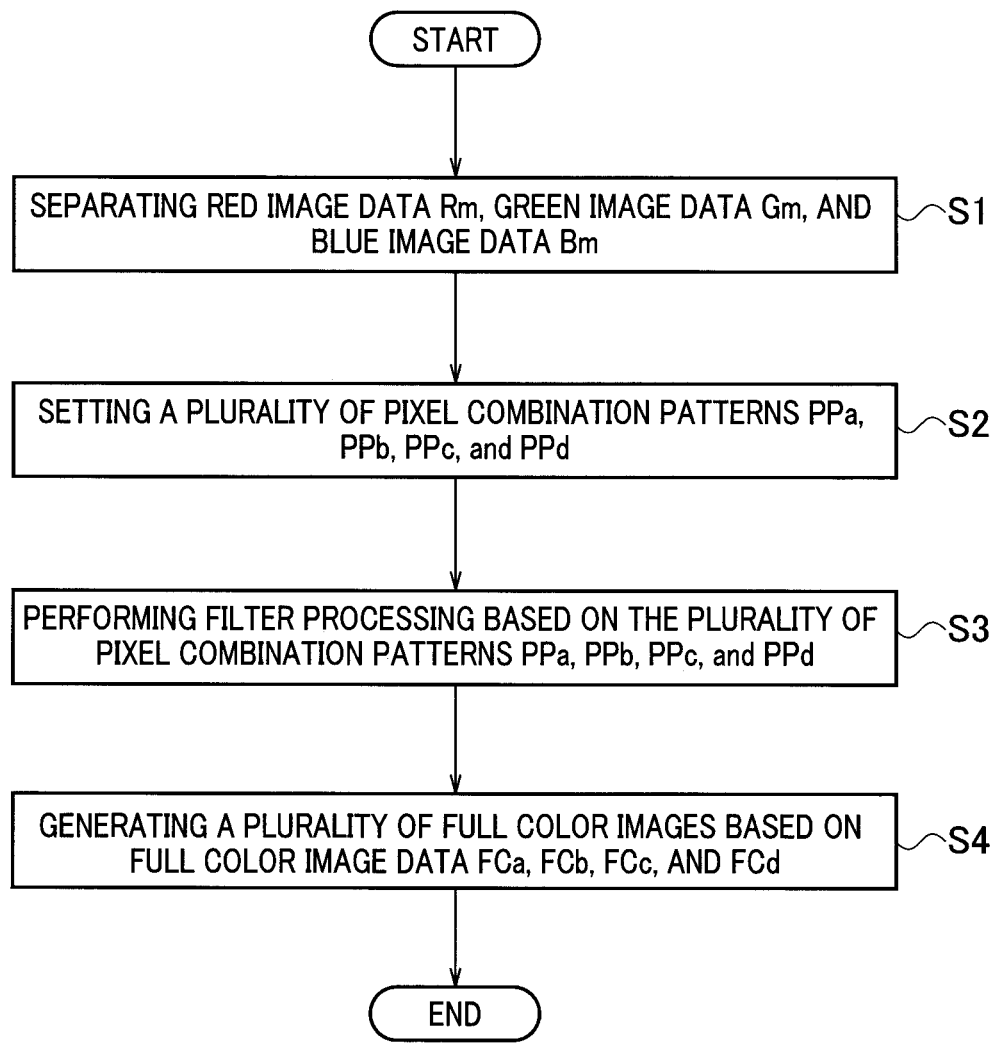
FIG. 4 is a flowchart illustrating an image processing method according to a first embodiment.

A description is given of an image processing device and an image processing method according to first and second embodiments, with reference to FIGS. 1-32. The image processing device and the image processing method according to first and second embodiments are an image display device and an image processing method by a color filter method, respectively.

First Embodiment

The image processing device according to a first embodiment will be described with reference to FIG. 1. FIG. 1 illustrates an image processing device 1 according to a first embodiment.

The image processing device 1 generates full color image data FC based on input image data ID, and outputs it to a display 100.

The image processing device 1 includes a color image separator 2, a filter controller 3, a filter processor 4, and a display image generator 5. The color image separator 2, the filter controller 3, the filter processor 4, and the display image generator 5 may be configured as an integrated circuit.

The color image separator 2 separates red image data Rm, green image data Gm, and blue image data Bm from the input image data ID.

The color image separator 2 outputs the red image data Rm, green image data Gm, and blue image data Bm to the filter controller 3 and the filter processor 4.

The filter controller 3 sets a plurality of pixel combination patterns PP for performing filter processing based on the image information of the red image data Rm, green image data Gm, and blue image data Bm. The filter controller 3 may select and set the appropriate pixel combination pattern PP from a storage unit in which a plurality of pixel combination patterns are stored in advance. The filter controller 3 may set appropriate pixel combination patterns PP based on a predetermined algorithm. The specific pixel combination patterns PP will be described later.

The filter controller 3 outputs pattern data DPP indicating the set pixel combination patterns PP to the filter processor 4.

The filter processor 4 performs filter processing for each pixel combination pattern on the red image data Rm, green image data Gm, and blue image data Bm, based on the inputted pattern data DPP.

The filter processor 4 outputs the filter-processed red image data Rf, green image data Gf, and blue image data Bf to the display image generator 5.

The display image generator 5 combines the red image data Rf, green image data Gf, and blue image data Bf to generate full color image data FC. The display image generator 5 outputs the full color image data FC to the display 100. The display 100 displays a full color image based on the full color image data FC.

The image processing method according to a first embodiment will be described with reference to FIGS. 2-31. Hereinafter, a state in which the pixels of the display 100 are diagonally arrayed by the color filter method will be described as an example. Note that the pixel array of the display 100 is not limited to the diagonal array.

FIG. 2 schematically shows the pixels which are diagonally arrayed on the display 100. In FIG. 2, R is an R pixel for displaying a red image. A red filter is arranged in the R pixel. G is a G pixel for displaying a green image. A green filter is arranged in the G pixel. B is a B pixel for displaying a blue image. A blue filter is arranged in the B pixel.

In order to display a full color image, three pixels of R pixel, G pixel, and B pixel which constitute the three primary colors of light are necessary. Therefore, one set of pixels composed of three pixels of R pixel, G pixel, and B pixel is defined as one unit of pixels for displaying a full color image.

FIG. 3 schematically shows a full color image of the input image data ID inputted to the color image separator 2 of the image processing device 1. In FIG. 3, each pixel data of the input image data ID is shown to correspond to the pixel of the display 100 shown in FIG. 2. For example, the pixel data RGB25 in FIG. 3 corresponds to the R pixel of the second row and the fifth column in FIG. 2. That is, FIGS. 2 and 3 show the input image and the display 100 to have the same resolution.

Each of the pixel data RGB11 to RGB18, RGB21 to RGB28, RGB31 to RGB38, RGB41 to RGB48, RGB51 to RGB58, RGB61 to RGB68, RGB71 to RGB78, RGB81 to RGB88, and RGB91 to RGB98 of the input image data ID includes image information of red, green, and blue components.

In FIGS. 2 and 3, a matrix of 9 rows and 8 columns is shown for easily describing of the pixel configuration, and the number of pixels and the resolution of the input image and the display 100 are not limited to this.

The image processing method according to a first embodiment will be described with reference to the flowchart shown in FIG. 4. In FIG. 4, in step S1, the color image separator 2 separates the red image data Rm, green image data Gm, and blue image data Bm from the input image data ID, and outputs them to the filter controller 3 and the filter processor 4.

FIG. 5 schematically shows the red image data Rm. FIG. 5 corresponds to FIG. 3. Each of the pixel data R11 to R18, R21 to R28, R31 to R38, R41 to R48, R51 to R58, R61 to R68, R71 to R78, R81 to R88, and R91 to R98 of the red image data Rm includes image information such as the gradation level and the like of the red component.

FIG. 6 schematically shows the green image data Gm. FIG. 6 corresponds to FIG. 3. Each of the pixel data G11 to G18, G21 to G28, G31 to G38, G41 to G48, G51 to G58, G61 to G68, G71 to G78, G81 to G88, and G91 to G98 of the green image data Gm includes image information such as the gradation level and the like of the green component.

FIG. 7 schematically shows the blue image data Bm. FIG. 7 corresponds to FIG. 3. Each of the pixel data B11 to B18, B21 to B28, B31 to B38, B41 to B48, B51 to B58, B61 to B68, B71 to B78, B81 to B88, and B91 to B98 of the blue image data Bm includes image information such as the gradation level and the like of the blue component.

FIGS. 8A-8D schematically show examples of a plurality of pixel combination patterns in the case where a pixel of interest is a G pixel in the diagonal array. FIGS. 8A-8D are partial diagrams showing a unit of pixels in FIG. 2.

In step S2 of FIG. 4, the filter controller 3 sets a plurality of pixel combination patterns PP, based on the red image data Rm, green image data Gm, and blue image data Bm. The plurality of pixel combination patterns PP includes pixel combination pattern PPa shown in FIG. 8A, pixel combination pattern PPb shown in FIG. 8B, pixel combination pattern PPc shown in FIG. 8C, and pixel combination pattern PPd shown in FIG. 8D, for example.

Each of the pixel combination patterns PPa to PPd is formed of a unit of pixels. The pixel combination patterns PPa to PPd may be stored in the filter controller 3 in advance, or may be set based on a predetermined algorithm.

The filter controller 3 outputs the pattern data DPP indicating the pixel combination patterns PP, specifically, the pattern data DPPa to DPPd indicating the pixel combination patterns PPa to PPd, to the filter processor 4.

In step S3, the filter processor 4 performs filter processing on the red image data Rm, green image data Gm, and blue image data Bm, based on the plurality of pixel combination patterns PPa to PPd.

Filter processing based on a plurality of pixel combination patterns PPa to PPd will be described with reference to FIGS. 9-30.

The filter processor 4 performs filter processing on the red image data Rm, green image data Gm, and blue image data Bm, based on the pixel combination pattern PPa.

FIG. 9 schematically shows the relationship between the red image data Rm and the pixel combination pattern PPa. The pixel combination pattern PPa is indicated by a thick frame. For example, R44 in FIG. 9 corresponds to the R pixel of the fourth row and the fourth column in the diagonal array shown in FIG. 2. R45 corresponds to the G pixel of the fourth row and the fifth column. R46 corresponds to the B pixel of the fourth row and the sixth column.

FIG. 10 schematically shows red image data Rfa subjected to filter processing based on the pixel combination pattern PPa. The pixels R11a, R14a, R17a, R22a, R25a, R28a, R33a, R36a, R41a, R44a, R47a, R52a, R55a, R58a, R63a, R66a, R71a, R74a, R77a, R82a, R85a, R88a, R93a, and R96a in FIG. 10 correspond to the R pixels of the diagonal array shown in FIG. 2.

The filter processor 4 generates the red image data Rfa (see FIG. 10) by performing filter processing on the red image data Rm based on the pixel combination pattern PPa.

Specifically, the filter processor 4 uses the pixel R44 of the red image data Rm corresponding to the pixel R44a of the red image data Rfa as a pixel of interest, and calculates an average value of the gradation levels of the pixels R44, R45, and R46 in the pixel combination pattern PPa, for example. The filter processor 4 sets the calculated average value as the gradation level of the pixel R44a of the red image data Rfa. The pixel R44a corresponds to the R pixel of the fourth row and the fourth column in the diagonal array shown in FIG. 2. Filter processing is also applied to the other R pixels based on the pixel combination pattern PPa.

The pixel R45 of the red image data Rm corresponds to the G pixel of the fourth row and the fifth column in the diagonal array shown in FIG. 2. The pixel R46 of the red image data Rm corresponds to the B pixel of the fourth row and the sixth column in the diagonal array shown in FIG. 2. The pixels R45 and R46, which are peripheral pixels of the pixel R44 corresponding to the pixel R44a of the red image data Rfa, correspond to the G pixel and the B pixel of the display 100. In the conventional manner, the pixels R45 and R46 are not reflected as data. By composing the pixel combination pattern PPa with a unit of pixels, the image information of the peripheral pixels R45 and R46, which are not reflected in the conventional manner, can be reflected as the pixel R44a of the red image data Rfa.

As shown in FIG. 9, the pixel combination patterns PPa are arranged in the R pixels of the red image data Rm without a gap. As a result, the filter processor 4 can perform filter processing on almost all R pixels of the red image data Rm. Therefore, almost all R pixels of the red image data Rm can be reflected on the red image data Rfa.

Note that pixels outside the pixel combination pattern PPa may be used as target pixels to be subjected to filter processing. Specifically, in the case where the pixel R 44 is a pixel of interest, for example, it suffices if the pixel R44 is included as a target pixel. Therefore, an average value of the gradation level of the pixels R43, R44, and R45 of the red image data Rm may be calculated, and the calculated average value may be set as the gradation level of the pixel R44a. In addition, an average value of the gradation level of the pixels R42, R43, and R44 of the red image data Rm may be calculated, and the calculated average value may be set as the gradation level of the pixel R44a.

FIG. 11 schematically shows the relationship between the green image data Gm and the pixel combination pattern PPa. The pixel combination pattern PPa is indicated by a thick frame. For example, G44 in FIG. 11 corresponds to the R pixel of the fourth row and the fourth column in the diagonal array shown in FIG. 2. G45 corresponds to the G pixel of the fourth row and the fifth column. G46 corresponds to the B pixel of the fourth row and the sixth column.

FIG. 12 schematically shows green image data Gfa subjected to filter processing based on the pixel combination pattern PPa. The pixels G12a, G15a, G18a, G23a, G26a, G31a, G34a, G37a, G42a, G45a, G48a, G53a, G56a, G61a, G64a, G67a, G72a, G75a, G78a, G83a, G86a, G91a, G94a, and G97 in FIG. 12 correspond to the G pixels of the diagonal array shown in FIG. 2.

The filter processor 4 generates the green image data Gfa (see FIG. 12) by performing filter processing on the green image data Gm based on the pixel combination pattern PPa.

Specifically, the filter processor 4 uses the pixel G45 of the green image data Gm corresponding to the pixel G45a of the green image data Gfa as a pixel of interest, and calculates an average value of the gradation levels of the pixels G44, G45, and G46 in the pixel combination pattern PPa, for example. The filter processor 4 sets the calculated average value as the gradation level of the pixel G45a of the green image data Gfa. The pixel G45a corresponds to the G pixel of the fourth row and the fifth column in the diagonal array shown in FIG. 2. Filter processing is also applied to the other G pixels based on the pixel combination pattern PPa.

The pixel R44 of the green image data Gm corresponds to the R pixel of the fourth row and the fourth column in the diagonal array shown in FIG. 2. The pixel R46 of the green image data Gm corresponds to the B pixel of the fourth row and the sixth column in the diagonal array shown in FIG. 2. The pixels G45 and G46, which are peripheral pixels of the pixel G45 corresponding to the pixel G45a of the green image data Gfa, correspond to the R pixel and the B pixel of the display 100. In the conventional manner, the pixels G44 and G46 are not reflected as data. By composing the pixel combination pattern PPa with a unit of pixels, the image information of the peripheral pixels G44 and G46, which are not reflected in the conventional manner, can be reflected as the pixel G45a of the green image data Gfa.

As shown in FIG. 11, the pixel combination patterns PPa are arranged in the G pixels of the green image data Gm without a gap. As a result, the filter processor 4 can perform filter processing on almost all G pixels of the green image data Gm. Therefore, almost all G pixels of the green image data Gm can be reflected on the green image data Gfa.

Note that pixels outside the pixel combination pattern PPa may be used as target pixels to be subjected to filter processing. Specifically, for example, in the case where the pixel G45 is a pixel of interest, it suffices if the pixel G45 is included as a target pixel. Therefore, an average value of the gradation level of the pixels G43, G44, and G45 of the green image data Gm may be calculated, and the calculated average value may be set as the gradation level of the pixel G45a. In addition, an average value of the gradation level of the pixels G45, G46, and G47 of the green image data Gm may be calculated, and the calculated average value may be set as the gradation level of the pixel R45a.

FIG. 13 schematically shows the relationship between the blue image data Bm and a pixel combination pattern PPa. The pixel combination pattern PPa is indicated by a thick frame. For example, B44 in FIG. 13 corresponds to the R pixel of the fourth row and the fourth column in the diagonal array shown in FIG. 2. B45 corresponds to the G pixel of the fourth row and the fifth column. B46 corresponds to the B pixel of the fourth row and the sixth column.

FIG. 14 schematically shows blue image data Bfa subjected to the filter processing based on the pixel combination pattern PPa. The pixels B13a, B16a, B21a, B24a, B27a, B32a, B35a, B38a, B43a, B46a, B51a, B54a, B57a, B62a, B65a, B68a, B73a, B76a, B81a, B84a, B87a, B92a, B95a, and B98 in FIG. 14 correspond to B pixels of the diagonal array shown in FIG. 2.

The filter processor 4 generates the blue image data Bfa (see FIG. 14) by performing filter processing on the blue image data Bm based on the pixel combination pattern PPa.

Specifically, the filter processor 4 uses the pixel B46 of the blue image data Bm corresponding to the pixel B46a of the blue image data Bfa as a pixel of interest, and calculates an average value of the gradation levels of the pixels B44, B45, and B46 in the pixel combination pattern PPa, for example. The filter processor 4 sets the calculated average value as the gradation level of the pixel B46a of the blue image data Bfa. The pixel B46a corresponds to the B pixel of the fourth row and the sixth column in the diagonal array shown in FIG. 2. Filter processing is also applied to the other B pixels based on the pixel combination pattern PPa.

The pixel R44 of the blue image data Bm corresponds to the R pixel of the fourth row and the fourth column in the diagonal array shown in FIG. 2. The pixel R45 of the blue image data Bm corresponds to the G pixel of the fourth row and the fifth column in the diagonal array shown in FIG. 2. The pixels B44 and B45, which are peripheral pixels of the pixel B46 corresponding to the pixel B46a of the blue image data Bfa, correspond to the R pixel and G pixel of the display 100. In the conventional manner, the pixels B44 and B45 are not reflected as data. By composing the pixel combination pattern PPa with a unit of pixels, the image information of the peripheral pixels B44 and B45, which are not reflected in the conventional manner, can be reflected as the pixel B46a of the blue image data Bfa.

As shown in FIG. 13, the pixel combination patterns PPa are arranged in the B pixels of the Blue image data Bm without a gap. As a result, the filter processor 4 can perform filter processing on almost all B pixels of the blue image data Bm. Therefore, almost all B pixels of the blue image data Bm can be reflected on the blue image data Bfa.

Note that pixels outside the pixel combination pattern PPa may be used as target pixels to be subjected to filter processing. Specifically, for example, in the case where the pixel B46 is a pixel of interest, it suffices if the pixel B46 is included as a target pixel. Therefore, an average value of the gradation level of the pixels B45, B46, and B47 of the blue image data Bm may be calculated, and the calculated average value may be set as the gradation level of the pixel B46a. In addition, an average value of the gradation level of the pixels B46, 347, and B48 of the blue image data Bm may be calculated, and the calculated average value may be set as the gradation level of the pixel R46a.

The filter processor 4 performs filter processing on the red image data Rm, green image data Gm, and blue image data Bm based on the pixel combination pattern PPb.

FIG. 15 schematically shows the relationship between the red image data Rm and the pixel combination pattern PPb. The pixel combination pattern PPb is indicated by a thick frame. For example, R24 in FIG. 15 corresponds to the B pixel of the second row and the fourth column in the diagonal array shown in FIG. 2. R34 corresponds to the G pixel of the third row and the fourth column. R44 corresponds to the R pixel of the fourth row and the fourth column.

FIG. 16 schematically shows red image data Rfb subjected to the filter processing based on the pixel combination pattern PPb. The pixels R11b, R14b, R17b, R22b, R25b, R28b, R33b, B36b, R41b, R44b, R47b, R52b, R55b, R58b, R63b, R66b, R71b, R74b, R77b, R82b, R85b, R88b, R93b, and R96b in FIG. 16 correspond to the R pixels of the diagonal array shown in FIG. 2.

The filter processor 4 generates the red image data Rfb (see FIG. 16) by performing filter processing on the red image data Rm based on the pixel combination pattern PPb.

Specifically, the filter processor 4 uses the pixel R44 of the red image data Rm corresponding to the pixel R44b of the red image data Rfb as a pixel of interest, and calculates an average value of the gradation levels of the pixels R24, R34, and R44 in the pixel combination pattern PPb, for example. The filter processor 4 sets the calculated average value as the gradation level of the pixel R44b of the red image data Rfb. The pixel R44b corresponds to the R pixel of the fourth row and the fourth column in the diagonal array shown in FIG. 2. Filter processing is also applied to the other R pixels based on the pixel combination pattern PPb.

The pixel R24 of the red image data Rm corresponds to the B pixel of the second row and the fourth column in the diagonal array shown in FIG. 2. The pixel R34 of the red image data Rm corresponds to the G pixel of the third row and the fourth column in the diagonal array shown in FIG. 2. The pixels R24 and R34, which are peripheral pixels of the pixel R44 corresponding to the pixel R44b of the red image data Rfb, correspond to the B pixel and the G pixel of the display 100. In the conventional manner, the pixels R24 and R34 are not reflected as data. By composing the pixel combination pattern PPb with a unit of pixels, the image information of the peripheral pixels R24 and R34, which are not reflected in the conventional manner, can be reflected as the pixel R44b of the red image data Rfb.

As shown in FIG. 15, the pixel combination patterns PPb are arranged in the R pixels of the red image data Rm without a gap. As a result, the filter processor 4 can perform filter processing on almost all R pixels of the red image data Rm. Therefore, almost all R pixels of the red image data Rm can be reflected on the red image data Rfb.

Note that pixels outside the pixel combination pattern PPb may be used as target pixels to be subjected to filter processing. Specifically, for example, in the case where the pixel R44 is a pixel of interest, it suffices if the pixel R44 is included as a target pixel. Therefore, an average value of the gradation level of the pixels R34, R44, and R54 of the red image data Rm may be calculated, and the calculated average value may be set as the gradation level of the pixel R44b. In addition, an average value of the gradation level of the pixels R44, R54, and R64 of the red image data Rm may be calculated, and the calculated average value may be set as the gradation level of the pixel R44b.

Figure 17:
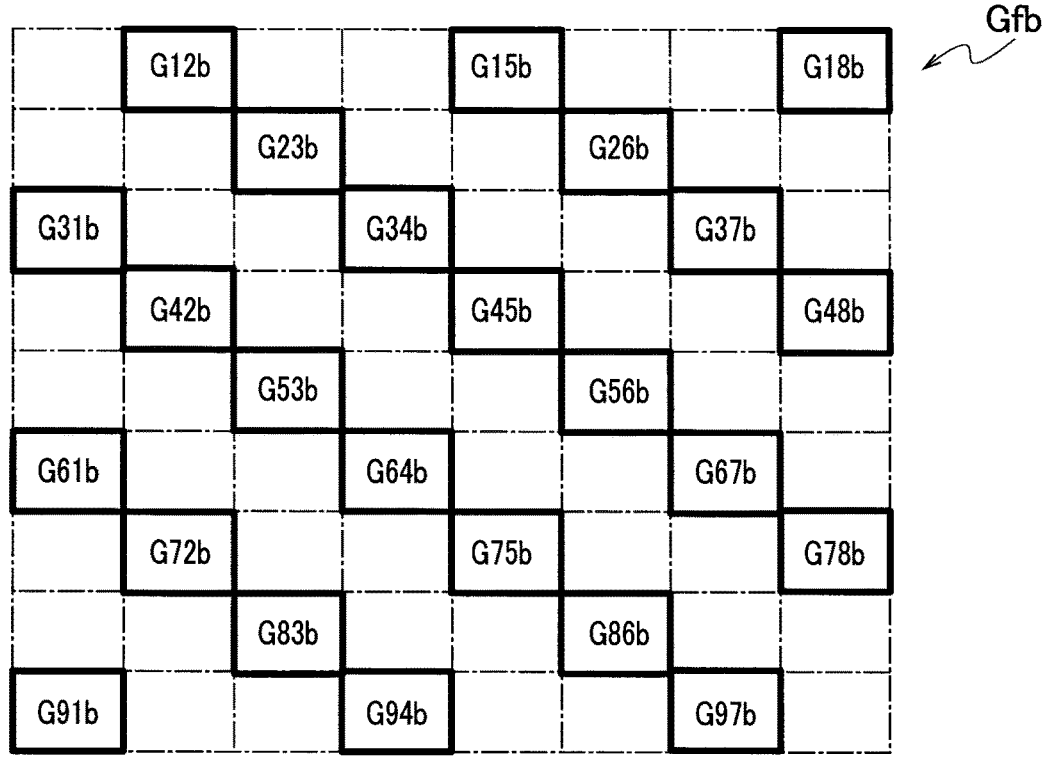
FIG. 17 is a schematic diagram illustrating a green image generated by filter processing based on the pixel combination pattern.

As similar to the red image data Rm, the filter processor 4 performs filter processing on almost all G pixels of the green image data Gm to generate green image data Gfb (see FIG. 17). Therefore, almost all the G pixels of the green image data Gm can be reflected on the green image data Gfb.

The pixels G12b, G15b, G18b, G23b, G26b, G31b, G34b, G37b, G42b, G45b, G48b, G53b, G56b, G61b, G64b, G67b, G72b, G75b, G78b, G83b, G86b, G91b, G94b, and G97b in FIG. 17 correspond to G pixels of the diagonal array shown in FIG. 2.

Figure 18:
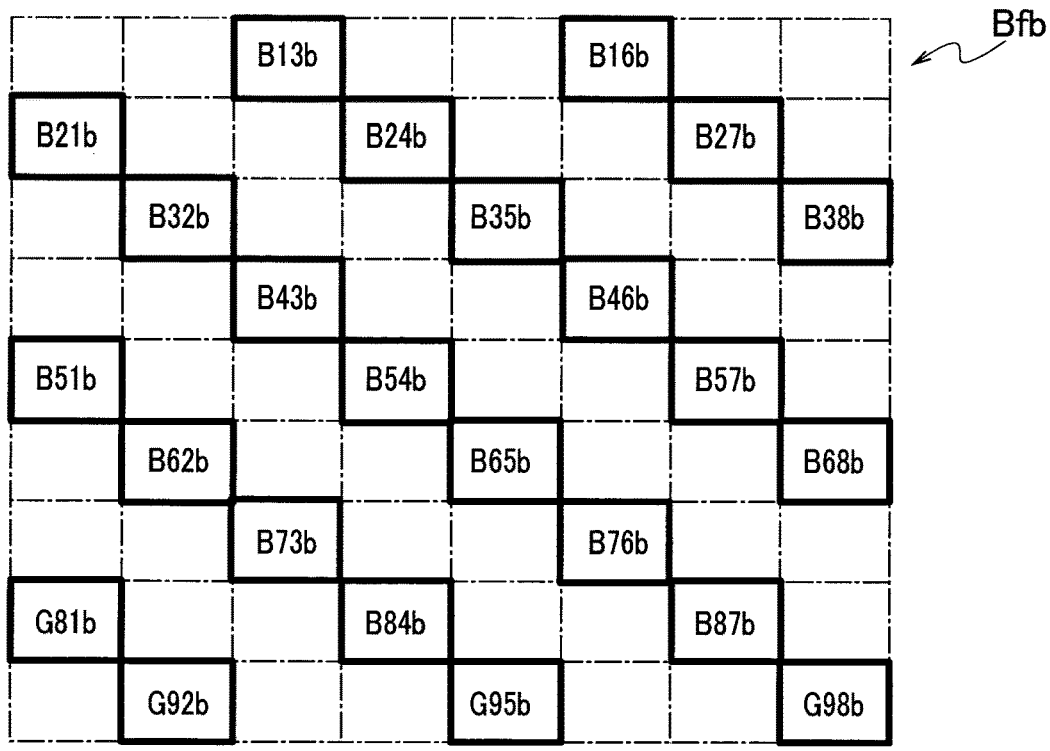
FIG. 18 is a schematic diagram illustrating a blue image generated by filter processing based on the pixel combination pattern.

As similar to the red image data Rm, the filter processor 4 performs filter processing on almost all B pixels of the blue image data Bm to generate blue image data Bfb (see FIG. 18). Therefore, almost all the B pixels of the blue image data Bm can be reflected on the blue image data Bfb.

The pixels B13b, B16b, B21b, B24b, B27b, B32b, B35b, B38b, B43b, B46b, B51b, B54b, B57b, B62b, B65b, B68b, B73b, B76b, B81b, B84b, B87b, B92b, B95b, and B98b in FIG. 18 correspond to B pixels of the diagonal array shown in FIG. 2.

The filter processor 4 performs filter processing on the red image data Rm, green image data Gm, and blue image data Bm based on the pixel combination pattern PPc.

FIG. 19 schematically shows the relationship between the red image data Rm and the pixel combination pattern PPc. The pixel combination pattern PPc is indicated by a thick frame. For example, R34 in FIG. 19 corresponds to the G pixel of the third row and the fourth column in the diagonal array shown in FIG. 2. R35 corresponds to the B pixel of the third row and the fifth column. R44 corresponds to the R pixel of the fourth row and the fourth column.

FIG. 20 schematically shows the red image data Rfc subjected to filter processing based on the pixel combination pattern PPc. The pixels R11c, R14c, R17c, R22c, R25c, R28c, R33c, R36c, R41c, R44c, R47c, R52c, R55c, R58c, R63c, R66c, R71c, R74c, R77c, R82c, R85c, R88c, R93c, and R96c in FIG. 20 correspond to the R pixels of the diagonal array shown in FIG. 2.

The filter processor 4 generates the red image data Rfc (see FIG. 20) by performing filter processing on the red image data Rm based on the pixel combination pattern PPc.

Specifically, the filter processor 4 uses the pixel R44 of the red image data Rm corresponding to the pixel R44c of the red image data Rfc as a pixel of interest, and calculates an average value of the gradation levels of the pixels R34, R35, and R44 in the pixel combination pattern PPc, for example. The filter processor 4 sets the calculated average value as the gradation level of the pixel R44c of the red image data Rfc. The pixel R44c corresponds to the R pixel of the fourth row and the fourth column in the diagonal array shown in FIG. 2. Filter processing is also applied to the other R pixels based on the pixel combination pattern PPc.

The pixel R34 of the red image data Rm corresponds to the G pixel of the third row and the fourth column in the diagonal array shown in FIG. 2. The pixel R35 of the red image data Rm corresponds to the B pixel of the third row and the fifth column in the diagonal array shown in FIG. 2. The pixels R34 and R35, which are peripheral pixels of the pixel R44 corresponding to the pixel R44c of the red image data Rfc, correspond to the G pixel and the B pixel of the display 100. In the conventional manner, the pixels R34 and R35 are not reflected as data. By composing the pixel combination pattern PPc with a unit of pixels, the image information of the peripheral pixels R34 and R35, which are not reflected in the conventional manner, can be reflected as the pixel R44c of the red image data Rfc.

As shown in FIG. 19, the pixel combination patterns PPc are arranged in the R pixels of the red image data Rm without a gap. As a result, the filter processor 4 can perform filter processing on almost all R pixels of the red image data Rm. Therefore, almost all R pixels of the red image data Rm can be reflected on the red image data Rfc.

As similar to the red image data Rm, the filter processor 4 performs filter processing on almost all G pixels of the green image data Gm to generate green image data Gfc (see FIG. 21). Therefore, almost all the G pixels of the green image data Gm can be reflected on the green image data Gfc.

The pixels G12c, G15c, G18c, G23c, G26c, G31c, G34c, G37c, G42c, G45c, G48c, G53c, G56c, G61c, G64c, G67c, G72c, G75c, G78c, G83c, G86c, G91c, G94c, and G97c in FIG. 21 correspond to G pixels of the diagonal array shown in FIG. 2.

As similar to the red image data Rm, the filter processor 4 performs filter processing on almost all B pixels of the blue image data Bm to generate blue image data Bfc (see FIG. 22). Therefore, almost all the B pixels of the blue image data Bm can be reflected on the blue image data Bfc.

The pixels B13c, B16c, B21c, B24c, B27c, B32c, B35c, B38c, B43c, B46c, B51c, B54c, B57c, B62c, B65c, B68c, B73c, B76c, B81c, B84c, B87c, B92c, B95c, and B98c in FIG. 22 correspond to B pixels of the diagonal array shown in FIG. 2.

The filter processor 4 performs filter processing on the red image data Rm, green image data Gm, and blue image data Bm based on the pixel combination pattern PPd.

FIG. 23 schematically shows the relationship between the red image data Rm and the pixel combination pattern PPd. The pixel combination pattern PPd is indicated by a thick frame. For example, R35 in FIG. 23 corresponds to the B pixel of the third row and the fifth column in the diagonal array shown in FIG. 2. R44 corresponds to the R pixel of the fourth row and the fourth column. R45 corresponds to the G pixel of the fourth row and the fifth column.

FIG. 24 schematically shows the red image data Rfd subjected to filter processing based on the pixel combination pattern PPd. The pixels R11d, R14d, R17d, R22d, R25d, R28d, R33d, R36d, R41d, R44d, R47d, R52d, R55d, R58d, R63d, R66d, R71d, R74d, R77d, R82d, R85d, R88d, R93d, and R96d in FIG. 24 correspond to the R pixels of the diagonal array shown in FIG. 2.

The filter processor 4 generates the red image data Rfd (see FIG. 24) by performing filter processing on the red image data Rm based on the pixel combination pattern PPd.

Specifically, the filter processor 4 uses the pixel R44 of the red image data Rm corresponding to the pixel R44d of the red image data Rfd as a pixel of interest, and calculates an average value of the gradation levels of the pixels R35, R44, and R45 in the pixel combination pattern PPd, for example. The filter processor 4 sets the calculated average value as the gradation level of the pixel R44d of the red image data Rfd. The pixel R44d corresponds to the R pixel of the fourth row and the fourth column in the diagonal array shown in FIG. 2. Filter processing is also applied to the other R pixels based on the pixel combination pattern PPd.

The pixel R35 of the red image data Rm corresponds to the B pixel of the third row and the fifth column in the diagonal array shown in FIG. 2. The pixel R45 of the red image data Rm corresponds to the G pixel of the fourth row and the fifth column in the diagonal array shown in FIG. 2. The pixels R35 and R45, which are peripheral pixels of the pixel R44 corresponding to the pixel R44d of the red image data Rfd, correspond to the B pixel and the G pixel of the display 100. In the conventional manner, the R35 and R45 are not reflected as data. By composing the pixel combination pattern PPd with a unit of pixels, the image information of the peripheral pixels R35 and R45, which are not reflected in the conventional manner, can be reflected as the pixel R44d of the red image data Rfd.

As shown in FIG. 23, the pixel combination patterns PPd are arranged in the R pixels of the red image data Rm without a gap. As a result, the filter processor 4 can perform filter processing on almost all R pixels of the red image data Rm. Therefore, almost all R pixels of the red image data Rm can be reflected on the red image data Rfd.

Figures 25, 26:
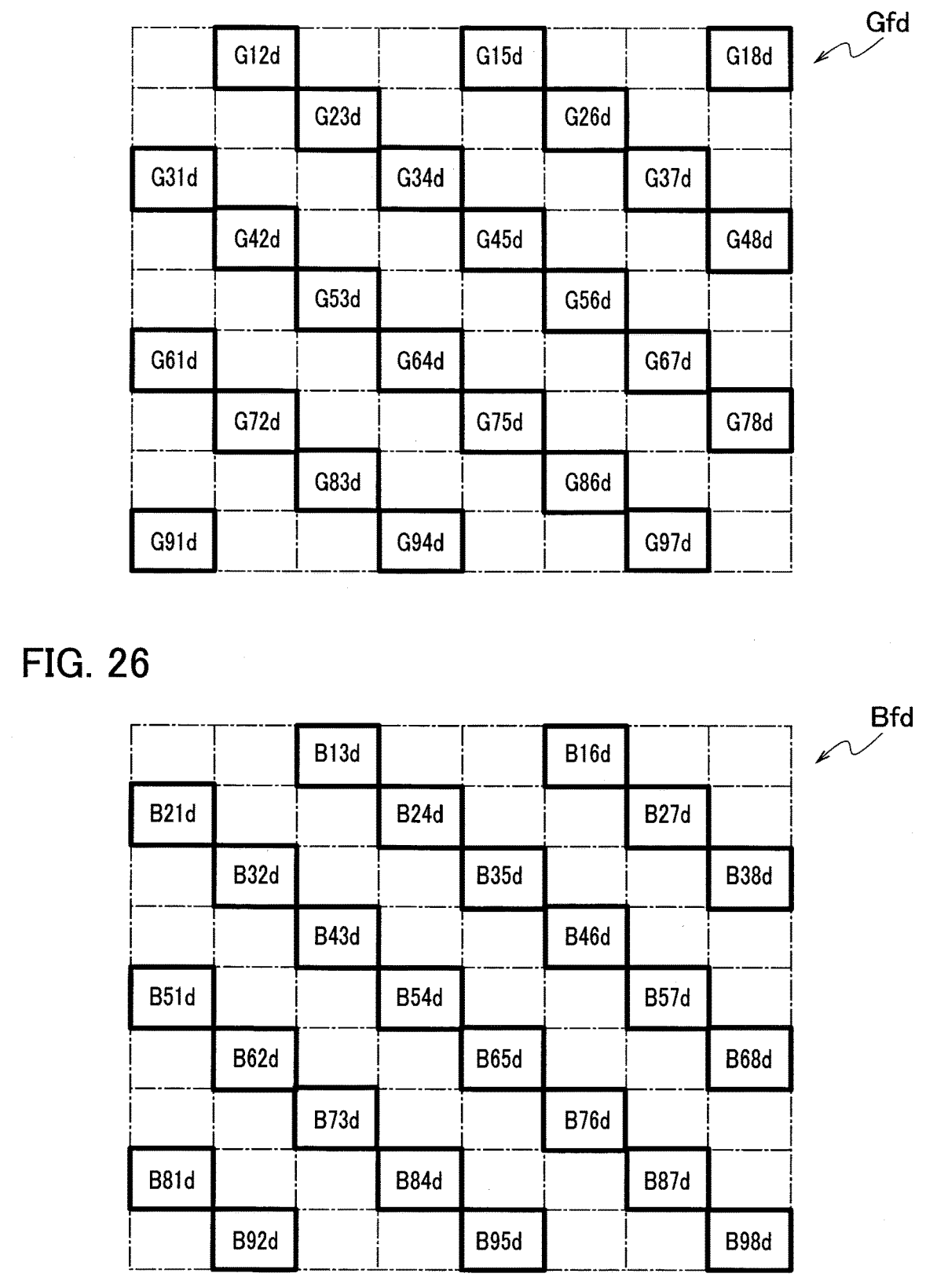

As similar to the red image data Rm, the filter processor 4 performs filter processing on almost all G pixels of the green image data Gm to generate green image data Gfd (see FIG. 25). Therefore, almost all the G pixels of the green image data Gm can be reflected on the green image data Gfd.

The pixels G12d, G15d, G18d, G23d, G26d, G31d, G34d, G37d, G42d, G45d, G48d, G53d, G56d, G61d, G64d, G67d, G72d, G75d, G78d, G83d, G86d, G91d, G94d, and G97d in FIG. 25 correspond to G pixels of the diagonal array shown in FIG. 2.

As similar to the red image data Rm, the filter processor 4 performs filter processing on almost all B pixels of the blue image data Bm to generate blue image data Bfd (see FIG. 26). Therefore, almost all the B pixels of the blue image data Bm can be reflected on the blue image data Bfd.

The pixels B13d, B16d, B21d, B24d, B27d, B32d, B35d, B38d, B43d, B46d, B51d, B54d, B57d, B62d, B65d, B68d, B73d, B76d, B81d, B84d, B87d, B92d, B95d, and B98d in FIG. 26 correspond to B pixels of the diagonal array shown in FIG. 2.

In step S4 of FIG. 4, the display image generator 5 combines the red image data Rf, green image data Gf, and blue image data Bf, generated based on a plurality of pixel combination patterns, for each filter processing by the same pixel combination pattern, and generates a plurality of full color images based on the full color image data FC.

Specifically, the display image generator 5 combines the red image data Rfa, green image data Gfa, and blue image data Bfa generated based on the pixel combination pattern PPa, and generates full color image data FCa shown in FIG. 27.

The display image generator 5 combines the red image data Rfb, green image data Gfb, and blue image data Bfb generated based on the pixel combination pattern PPb, and generates full color image data FCb shown in FIG. 28.

Figure 29:
FIG. 29 is a schematic diagram illustrating a full color image obtained by combining a red image, a green image, and a blue image generated by the filter processing.

The display image generator 5 combines the red image data Rfc, green image data Gfc, and blue image data Bfc generated based on the pixel combination pattern PPc, and generates full color image data FCc shown in FIG. 29.

Figure 30:
FIG. 30 is a schematic diagram illustrating a full color image obtained by combining a red image, a green image, and a blue image generated by the filter processing.

The display image generator 5 combines the red image data Rfd, green image data Gfd, and blue image data Bfd generated based on the pixel combination pattern PPd, and generates full color image data FCd shown in FIG. 30.

The display image generator 5 outputs the full color image data FCa, FCb, FCc, or FCd to the display 100.

Figure 31:
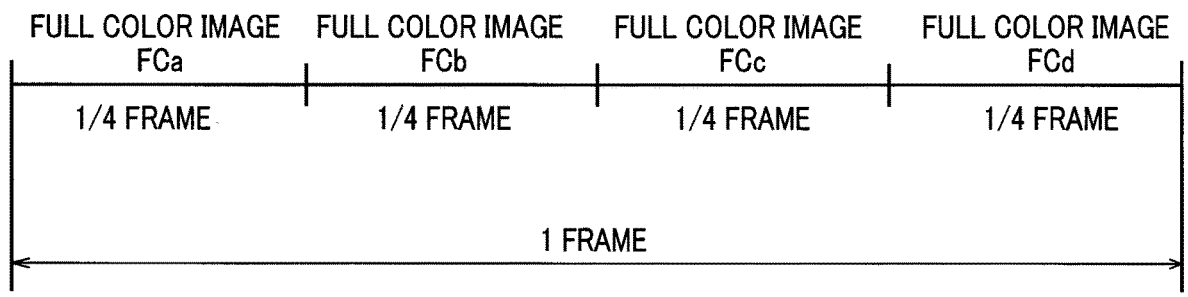
FIG. 31 is a schematic diagram illustrating the timing at which a full color image is displayed on the display.
Figure 32A:
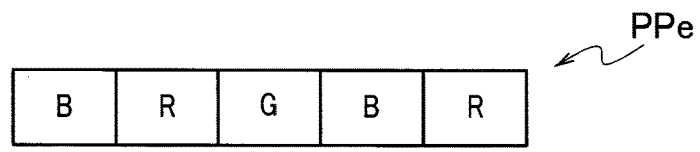
FIGS. 32A-32F are schematic diagrams illustrating an example of a plurality of pixel combination patterns in a case where the pixel of interest is a G pixel in the diagonal array.
Figure 32B:
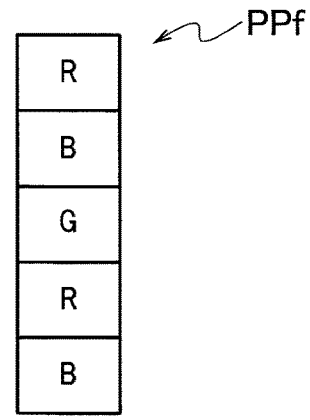
Figure 32C:
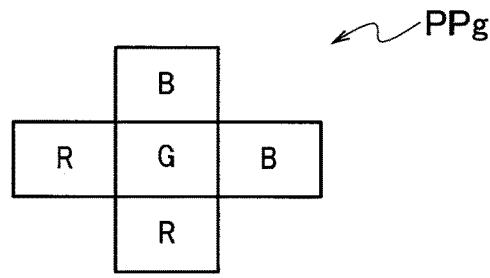
Figure 32D:
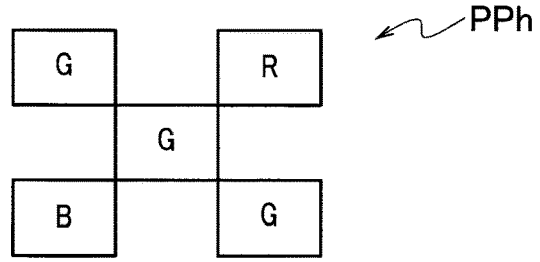
Figure 32E:
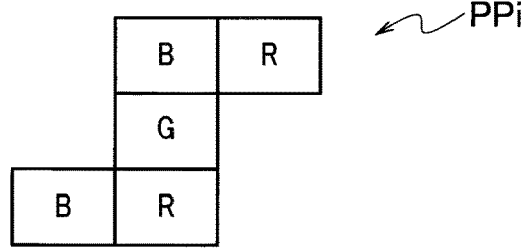
Figure 32F:
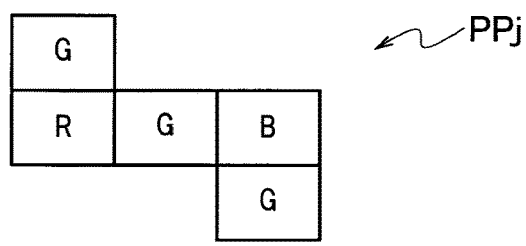

FIG. 31 schematically shows the timing at which the full color image data FCa, FCb, FCc, or FCd is displayed on the display 100 as a full color image.

The full color image data FCa, FCb, FCc, or FCd are switched every ¼ frame within one frame period. The order or timings at which the full color image data FCa, FCb, FCc, or FCd are switched within one frame period are controlled by the display image generator 5, the filter processor 4, or the filter controller 3.

The full color image based on the full color image data FCa, FCb, FCc, or FCd is switched and displayed within one frame period on the display 100.

For example, when the pixel R44 of the red image data Rm is set as a target pixel, the pixel R44a of the full color image data FCa is set based on the image information of the pixels R44, R45, and R46. The pixel R44b of the full color image data FCb is set based on the image information of the pixels R24, R34, and R44. The pixel R44c of the full color image data FCc is set based on the image information of the pixels R34, R35, and R44. The pixel R44d of the full color image data FCd is set based on the image information of the pixels R35, R44, and R45.

The pixels R44a, R44b, R44c, and R44d of the full color image data FCa, FCb, FCc, and FCd are displayed on the R pixel of the fourth row and the fourth column (see FIG. 2) in the display 100. The same applies to the other R pixels, G pixels, and B pixels of the full color image data FCa, FCb, FCc, and FCd.

The full color image data FCa, FCb, FCc, and FCd are generated by each filter processing in which pixel combination patterns are different from one another. By switching the full color image data FCa, FCb, FCc, and FCd within one frame period, the full color image displayed on the display 100 is subjected to filter processing using more peripheral pixels as target pixels, as compared with a full color image generated by a single filter processing. That is, by switching the full color image data FCa, FCb, FCc, and FCd within one frame period, full color images generated with more image information are displayed on the display 100.

Therefore, switching the full color image data FCa, FCb, FCc, and FCd within one frame period can improve the image quality of the full color image more than the full color image generated by a single filter processing.

In accordance with the image processing device and the image processing method according to a first embodiment, it is possible to suppress the deterioration of the image quality caused by lowering the resolution of the display image with respect to the input image in the color filter method.

Note that in accordance with the image processing device and the image processing method according to a first embodiment, the pixel combination patterns are set using the G pixel as a pixel of interest. However, a pixel of interest is not limited to the G pixel, and pixel combination patterns may be set with the R pixel or the B pixel as a pixel of interest.

In addition, in accordance with the image processing device and the image processing method according to a first embodiment, four pixel combination patterns PPa to PPd are set as a plurality of pixel combination patterns. However, pixel combination patterns are not limited to four patterns; two or more pixel combination patterns may be set.

When setting two pixel combination patterns, combinations having relationships complementing each other are desirable. For example, a combination of the pixel combination pattern PPa including the horizontal peripheral pixels and the pixel combination pattern PPb including the vertical peripheral pixels is desirable. For the same reason, a combination of the pixel combination patterns PPc and PPd is desirable.

Second Embodiment

The image processing device according to a second embodiment has the same configuration as the image processing device according to a first embodiment. Pixel combination patterns for filter processing, specifically, the number of pixels of a pixel combination pattern in a second embodiment is different from that of in a first embodiment. In order to make the explanation easy to understand, the same reference numerals are given to the same configurations as those of the image processing device 1 according to a first embodiment.

FIGS. 32A-32F schematically show an example of a plurality of pixel combination patterns in the case where a pixel of interest is a G pixel in the diagonal array. FIGS. 32A-32F correspond to FIGS. 8A-8D. Pixel combination patterns may be set using an R pixel or a B pixel as a pixel of interest.

The filter controller 3 sets a plurality of pixel combination patterns PP, based on the red image data Rm, green image data Gm, and blue image data Bm. The plurality of pixel combination patterns PP are pixel combination pattern PPe shown in FIG. 32A, pixel combination pattern PPf shown in FIG. 32B, pixel combination pattern PPg shown in FIG. 32C, pixel combination pattern PPh shown in FIG. 32D, pixel combination pattern PPi shown in FIG. 32E, and pixel combination pattern PPj shown in FIG. 32F, for example.

As shown in FIGS. 32A-32F, the pixel combination patterns PPe, PPf, PPg, PPh, PPi, and PPj only needs to include one unit of pixels.

The pixel combination patterns PPe to PPj may be stored in the filter controller 3 in advance, or may be set based on a predetermined algorithm.

The filter processor 4 performs filter processing on the red image data Rm, green image data Gm, and blue image data Bm, based on the plurality of pixel combination patterns PPe to PPj.

Each of the pixel combination patterns PPe to PPj are arranged without a gap as similar to a first embodiment (see FIGS. 9, 15, and 23). As a result, the filter processor 4 can perform filter processing on almost all R pixels of the red image data Rm, almost all G pixels of the green image data Gm, and almost all B pixels of the blue image data Bm.

The image processing method after filter processing is the same as that of the image processing method according to a first embodiment.

Note that the six pixel combination patterns PPe to PPj are set as a plurality of pixel combination patterns. However, pixel combination patterns are not limited to six patterns; two or more pixel combination patterns may be set.

When setting two pixel combination patterns, combinations having relationships complementing each other are desirable. For example, a combination of the pixel combination pattern PPe including the horizontal peripheral pixels and the pixel combination pattern PPf including the vertical peripheral pixels is desirable. For the same reason, a combination of the pixel combination patterns PPg and PPh, and a combination of the pixel combination patterns PPi and PPj are desirable.

When performing filter processing, depending on an image, a large number of pixels of the pixel combination pattern may be a factor of deteriorating image quality. This is because image information not only of necessary peripheral pixels but also of unnecessary peripheral pixels is reflected in filter processing.

On the other hand, depending on an image, a small number of pixels of the pixel combination pattern may be another factor of deteriorating image quality. This is because image information of necessary peripheral pixels is not reflected in the filter processing.

Therefore, filter processing may be performed with a plurality of pixel combination patterns having different numbers of pixels, depending on the image. Specifically, filter processing using any of the pixel combination patterns PPa to PPd and filter processing using any of the pixel combination patterns PPe to PPj may be combined.

The pixel combination patterns for performing filter processing are not limited to the pixel combination patterns PPa to PPd and the pixel combination patterns PPe to PPj. It is desirable that the pixel combination pattern has a shape that can be arranged without a gap, such as the pixel combination patterns PPa to PPd and the pixel combination patterns PPe to PPj.

The present invention is not limited to the above-described first and second embodiments, and various modifications can be made without departing from the scope of the invention. As mentioned above, each of the color image separating unit 2, the filter controller 3, the filter processor 4, and the display image generator 5 constituting the image processing device 1 may be composed of a circuit, or the image processing device 1 may be composed of a computing device. The color image separating unit 2, the filter controller 3, the filter processor 4, and the display image generator 5 may be composed of a software module (a computer program) executed in a processor of the computing device.

The image processing device 1 may include an input unit and an output unit configured by hardware. The image processing device 1 may be configured in such a way that the input image data ID is supplied to the color image separator 2 via the input unit, processed in each of the color image separating unit 2, the filter controller 3, the filter processor 4, and the display image generator 5, and outputted from the display image generator 5 to the display 100, or the like, via the output unit.

What is claimed is:
1. An image display device comprising:
 a display comprising color filters including red filters corresponding to red pixels for displaying red images, green filters corresponding to green pixels for displaying green images, and blue filters corresponding to blue pixels for displaying blue images, the red, green, and blue filters being arrayed in a predetermined array pattern;
 a color image separator in which input image data is supplied, each pixel data of the input image data including image information of red, green, and blue components, and configured to separate red image data, green image data, and blue image data from input image data, the red image data including red pixel data for the red, green, and blue pixels of the display, the green image data including green pixel data for the red, green, and blue pixels of the display, and the blue image data including blue pixel data for the red, green, and blue pixels of the display;

a filter controller configured to set a plurality of pixel combination patterns for performing filter processing on the red image data, green image data, and blue image data, each of the plurality of pixel combination patterns comprising three or more adjacent pixels, and each of the three or more adjacent pixels comprising at least one red pixel of the display, at least one green pixel of the display, and at least one blue pixel of the display;

a filter processor configured to perform filter processing for each of the plurality of pixel combination patterns on the red image data, the green image data, and the blue image data to generate filter-processed red image data, filter-processed green image data, and filter-processed blue image data, in such a way that each pixel combination pattern is assigned to the red pixel data of the red image data, the green pixel data of the green image data, and the blue pixel data of the blue image data, when generating the filter-processed red image data, each red pixel data among the red, green, and blue pixel data in each pixel combination pattern is taken as a pixel of interest, and each red pixel data corresponding to each red pixel of the display is generated based on the red, green, and blue pixel data in each pixel combination pattern, as the filter-processed red image data, when generating the filter-processed green image data, each green data among the red, green, and blue pixel data in each pixel combination pattern is taken as a pixel of interest, and each green pixel data corresponding to each green pixel of the display is generated based on the red, green, and blue pixel data in each pixel combination pattern, as the filter-processed green image data, and when generating the filter-processed blue image data, each blue data among the red, green, and blue pixel data in each pixel combination pattern is taken as a pixel of interest, and each blue pixel data corresponding to each blue pixel of the display is generated based on the red, green, and blue pixel data in each pixel combination pattern, as the filter-processed blue image data;

a display image generator configured to combine the filter-processed red image data, filter-processed green image data, and filter-processed blue image data, for each filter processing by the same pixel combination pattern, to generate a plurality of full color images.

2. The image display device according to claim 1, wherein the filter controller, the filter processor, or display image generator is configured to control to switch the plurality of full color images within one frame period.

3. The image display device according to claim 1, wherein the filter processor calculates an average value of each gradation level of the red, green, and blue pixel data in each pixel combination pattern to generate the filter-processed red, green, and blue image data.

4. An image processing method to process input image data, and to supply processed image data to a display, each pixel data of the input image data including image information of red, green, and blue components, and the display comprising color filters including red filters corresponding to red pixels for displaying red images, green filters corresponding to green pixels for displaying green images, and blue filters corresponding to blue pixels for displaying blue images, the red, green, and blue filters being arrayed in a predetermined array pattern, the image processing method comprising:

separating red image data, green image data, and blue image data from the input image data, the red image data including red pixel data for the red, green, and blue pixels of the display, the green image data including green pixel data for the red, green, and blue pixels of the display, and the blue image data including blue pixel data for the red, green, and blue pixels of the display;

setting a plurality of pixel combination patterns for performing filter processing on the red image data, green image data, and blue image data, each of the plurality of pixel combination patterns comprising three or more adjacent pixels, and each of the three or more adjacent pixels comprising at least one red pixel of the display, at least one green pixel of the display, and at least one blue pixel of the display;

performing filter processing for each of the plurality of pixel combination patterns on the red image data, green image data, and blue image data to generate filter-processed red image data, filter-processed green image data, and filter-processed blue image data, in such a way that each pixel combination pattern is assigned to the red pixel data of the red image data, the green pixel data of the green image data, and the blue pixel data of the blue image data, when generating the filter-processed red image data, each red pixel data among the red, green, and blue pixel data in each pixel combination pattern is taken as a pixel of interest, and each red pixel data corresponding to each red pixel of the display is generated based on the red, green, and blue pixel data in each pixel combination pattern, as the filter-processed red image data, when generating the filter-processed green image data, each green data among the red, green, and blue pixel data in each pixel combination pattern is taken as a pixel of interest, and each green pixel data corresponding to each green pixel of the display is generated based on the red, green, and blue pixel data in each pixel combination pattern, as the filter-processed green image data, and when generating the filter-processed blue image data, each blue data among the red, green, and blue pixel data in each pixel combination pattern is taken as a pixel of interest, and each blue pixel data corresponding to each blue pixel of the display is generated based on the red, green, and blue pixel data in each pixel combination pattern, as the filter-processed blue image data; and combining the filter-processed red image data, filter-processed green image data, and filter-processed blue image data, for each filter processing by the same pixel combination pattern, thus generating a plurality of full color images.

5. The image processing method according to claim 3, further comprising switching the plurality of full color images within one frame period.

6. The image processing method according to claim 4, wherein the performing filter processing comprises calculating an average value of each gradation level of the red, green, and blue pixel data in each pixel combination pattern to generate the filter-processed red, green, and blue image data.

* * * * *